(12) United States Patent
Haerms et al.

(10) Patent No.: US 9,509,175 B2
(45) Date of Patent: Nov. 29, 2016

(54) GAS TURBINE POWER GENERATION SYSTEM COMPRISING AN EMERGENCY POWER SUPPLY SYSTEM

(71) Applicant: ALSTOM Technology Ltd, Baden (CH)

(72) Inventors: Axel Haerms, Nussbaumen (CH); Wolfgand Lang, Lauchringen (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/164,295

(22) Filed: Jan. 27, 2014

(65) Prior Publication Data
US 2014/0210210 A1    Jul. 31, 2014

(30) Foreign Application Priority Data

Jan. 28, 2013    (EP) ..................... 13152887

(51) Int. Cl.
*F01P 9/00* (2006.01)
*H02J 11/00* (2006.01)
*F02C 9/46* (2006.01)
(Continued)

(52) U.S. Cl.
CPC ............ *H02J 11/00* (2013.01); *F01D 21/00* (2013.01); *F02C 9/46* (2013.01); *H01M 8/04089* (2013.01); *H01M 8/04201* (2013.01); *H02K 7/1823* (2013.01); *F05D 2270/09* (2013.01);
(Continued)

(58) Field of Classification Search
CPC ...... F01D 21/00; F02C 9/46; F05D 2270/09; H01M 2250/10; H01M 8/04089; H01M 8/04201; H02J 11/00; H02K 7/1823; Y02B 90/14; Y02E 60/50
See application file for complete search history.

(56) References Cited

U.S. PATENT DOCUMENTS 5,482,791 A    1/1996    Shingai et al.
5,783,932 A *  7/1998    Namba et al. .................. 322/16
(Continued)

FOREIGN PATENT DOCUMENTS

CN    202034819    11/2011
JP    8-236134    9/1996
(Continued)

OTHER PUBLICATIONS

Office Action issued from Chinese Patent Office dated Jun. 30, 2015 for CN Application No. 201410041598.9.
(Continued)

*Primary Examiner* — Tulsidas C Patel
*Assistant Examiner* — S. Mikailoff
(74) *Attorney, Agent, or Firm* — Buchanan Ingersoll & Rooney PC

(57) ABSTRACT

The present invention relates to a gas turbine power generation system, that includes a hydrogen-cooled generator having hydrogen as coolant, a plant hydrogen storage, generator auxiliaries and an emergency power supply system. The power generation system includes a fuel cell using hydrogen as fuel. The fuel cell is supplied via a line with hydrogen fuel from the hydrogen filling of the hydrogen-cooled generator in case of failure or disruption of the power supply from the gas turbine power generation system. In a preferred embodiment the fuel cell is supplied with additional hydrogen via a line from the plant hydrogen storage and/or with additional hydrogen via a line from generator auxiliaries in case of failure or disruption of the power supply from the gas turbine power generation system.

18 Claims, 1 Drawing Sheet

(51) Int. Cl.
*H01M 8/04* (2016.01)
*H02K 7/18* (2006.01)
*F01D 21/00* (2006.01)

(52) U.S. Cl.
CPC ........... *H01M2250/10* (2013.01); *Y02B 90/14* (2013.01); *Y02E 60/50* (2013.01); *Y10T 307/615* (2015.04)

(56) References Cited

U.S. PATENT DOCUMENTS

| 5,956,970 | A  | * | 9/1999 | Sato ..................... C01B 3/508 |
| | | | | 62/617 |
| 6,992,401 | B1 | * | 1/2006 | Johnson ........................ 290/1 A |
| 2004/0094963 | A1 | * | 5/2004 | Johnson ................... H02J 9/06 |
| | | | | 290/2 |
| 2007/0000789 | A1 | * | 1/2007 | Libby et al. ................. 205/637 |
| 2007/0057510 | A1 | | 3/2007 | Meyers et al. |
| 2009/0028767 | A1 | * | 1/2009 | Parker et al. ................. 423/235 |
| 2013/0257199 | A1 | * | 10/2013 | Perry ................... B01D 53/326 |
| | | | | 310/55 |

FOREIGN PATENT DOCUMENTS

| JP | 2004-129337 | | 4/2004 | |
| KR | 10-2009-0064853 | A | 6/2009 | |
| SU | 694943 | A | 10/1979 | |
| SU | 928535 | A2 | 5/1982 | |
| WO | 99/22127 | | 5/1999 | |
| WO | 01/71885 | | 9/2001 | |
| WO | WO 2012091692 | A1 * | 7/2012 | ........... B01D 53/326 |

OTHER PUBLICATIONS

Decision of Grant issued from Russian Patent Office dated Mar. 25, 2015 for RU Application No. 2014102563.

* cited by examiner

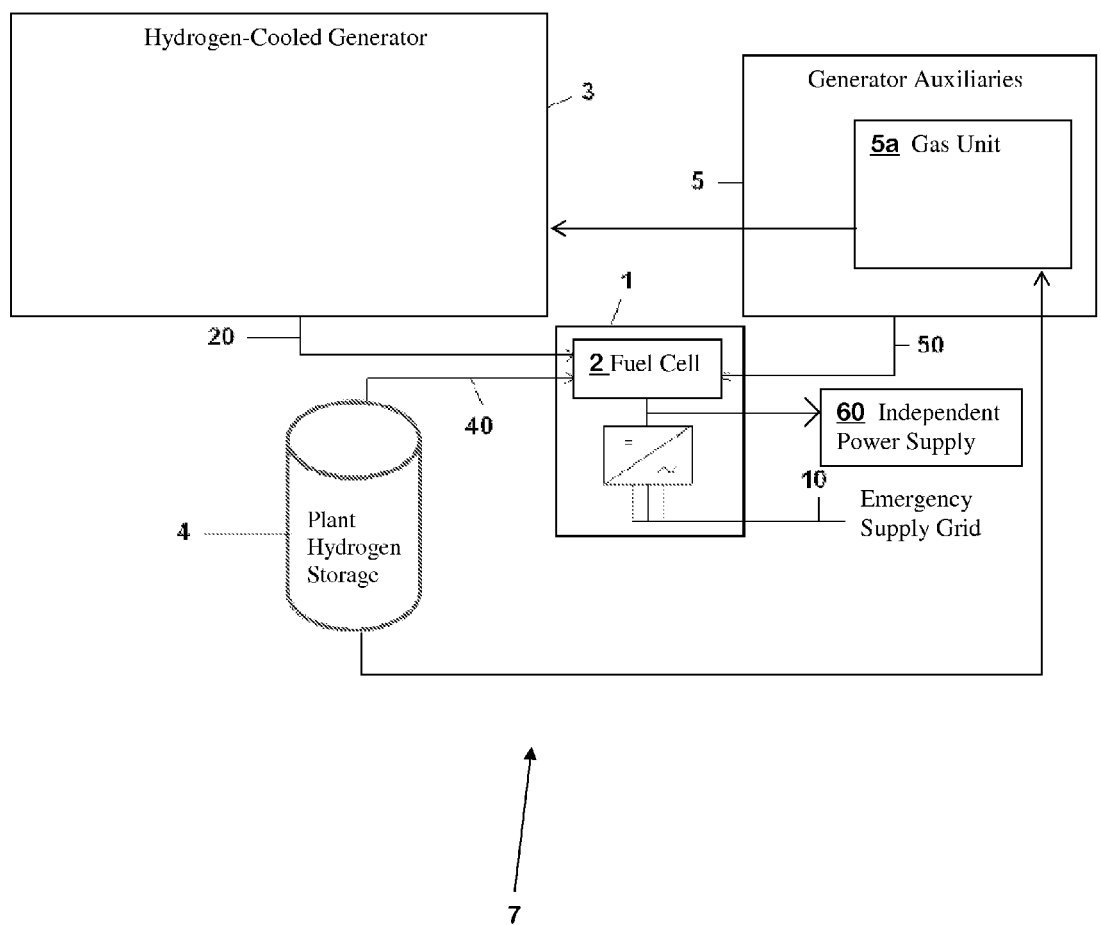

GAS TURBINE POWER GENERATION SYSTEM COMPRISING AN EMERGENCY POWER SUPPLY SYSTEM

CROSS-REFERENCE TO RELATED APPLICATIONS

This application claims priority to European application 13152887.9 filed Jan. 28, 2013, the contents of which are hereby incorporated in its entirety.

FIELD OF THE INVENTION

The present invention relates to a gas turbine power generation system comprising an emergency power supply system, more specifically an emergency power supply system providing uninterruptible power supply in the gas turbine power generation system.

BACKGROUND

In power generation systems for large scale electricity generating applications, the gas turbine is typically used to drive a synchronous generator which provides the electrical power output of the system. As it is of primary importance that the electrical output is not interrupted, especially in transient and emergency conditions that can lead to total or partial blackouts, these power generation systems are typically equipped with emergency power supply systems, which are independent power generation systems, assuring uninterrupted power supply in cases of failure or disruption.

Uninterruptible power supply (UPS) systems are known emergency power supply systems in the state of the art, automatically providing emergency power, without delay or transients, to critical applications in case of an interruption or an unacceptable condition of the main supply provided by the power generation system. Typically, the basic UPS system comprises a battery, a charger and an inverter, such that the battery provides the power supply needed to complement the main power supply from the power generation system, thus maintaining the security of the cited power supply.

However, in cases where the electrical power supply needed goes beyond the capacity of the battery or batteries comprised in the typical UPS systems, a further independent power generating system needs to be installed. Typically, this independent power generating system comprises a diesel generator, known as standby diesel generator, being a combination of a diesel engine with an electrical generator, often an alternator, to generate electrical energy. Therefore, in such cases, emergency power supply systems comprise both a UPS and a standby diesel generator. However, the problem of these emergency systems is that they are complex, expensive and require significant space in the power generation system arrangement. Moreover, a restart of the power generation system after the occurrence of a failure or disruption, is only permitted if the UPS system is again available, meaning that the batteries in the UPS need to be charged, leading to a cost and time consuming process.

It is known in the state of the art the use of fuel cells for providing uninterruptible power supply, providing long run times in a small space. A fuel cell converts the chemical energy from a fuel into electricity through a chemical reaction. Fuel cells are different from batteries in that they require a constant source of fuel and oxygen to run, but they can produce electricity continually for as long as these inputs are supplied. Fuel cells used for uninterrupted power supply are known in the state of the art, as per JP 2004129337 (A), JP 8236134 (A), CN 202034819 (U) or WO 01/71885 A1.

U.S. Pat. No. 6,992,401 B1 discloses an uninterruptable emergency power supply system for a telecommunication facility comprising proton exchange membrane fuel cells supplied with hydrogen as fuel which fuel is stored on site for immediate use in case of failure of a power supply from an external source and a power supply from micro gas turbines.

In U.S. 2007/057510 A1 is an uninterruptable emergency system for a tele-communication facility described with a fuel cell supplied with hydrogen via supply storage tanks in case the primary AC power source for example a micro gas turbine generator is out of service.

A combined power generation system comprising a fuel cell and a gas turbine is known from document U.S. Pat. No. 5,482,791: the fuel cell generates electric power which, together with the electric power generated by a generator driven by the gas turbine is sent to an electric power system. However, part of this power is consumed by an electric motor driving an air compressor, needed to feed the fuel cell, so the efficiency of this power generation system is reduced and further fuel cells are needed in case of large demand operating gas turbines, which is costly and which makes the system more complex.

The present invention is intended to solve the above-mentioned disadvantages and limitations in the prior art, as it will be further explained in detail.

SUMMARY

The present invention relates to a gas turbine power generation system, comprising a hydrogen-cooled generator having gaseous hydrogen as coolant, a plant hydrogen storage, generator auxiliaries and an emergency power supply system, providing uninterruptible power supply. The emergency power supply system according to the invention comprises a fuel cell, using hydrogen as fuel, wherein the fuel cell being supplied via a separate line with hydrogen fuel from the hydrogen filling of the hydrogen-cooled generator in case of failure or disruption of the power supply from the gas turbine power generation system.

According to an embodiment of the invention, the fuel cell being supplied with additional hydrogen via a line from the plant hydrogen storage and/or with additional hydrogen via a line from generator auxiliaries in case of failure or disruption of the power supply from the gas turbine power generation system.

With the system of the invention, a reduction in both the equipment and the space requirements is obtained. Furthermore, the availability of the gas turbine power generation system is increased, after the occurrence of a failure or disruption in the power supply.

The emergency power supply system according to the invention can be configured as an uninterruptible power supply (UPS) system providing emergency power in a gas turbine power generation system.

The emergency power supply system of the invention can also be configured as an independent power generating system feeding a gas turbine power generation system.

Furthermore, the emergency power supply system according to the invention can be configured as an uninterruptible power supply (UPS) system and an independent power generating system, both configured into one system and used within a gas turbine power generation system.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings.

FIG. 1 shows schematically a gas turbine power generation system according to the invention.

DETAILED DESCRIPTION

The present invention relates to a gas turbine power generation system providing uninterruptible power supply. The gas turbine power generation system 7 comprises a hydrogen-cooled generator 3, comprising gaseous hydrogen as a coolant. During normal power generation operation of the plant the hydrogen for the hydrogen-cooled generator 3 is supplied from a plant hydrogen storage 4 to the generator auxiliaries 5. The hydrogen is supplied, conditioned, cleaned and cooled in the gas unit 5a of the generator auxiliaries 5 for its application in the hydrogen-cooled generator 3.

The emergency power supply system 1 of the invention comprises a fuel cell 2 of the hydrogen type (using hydrogen as fuel), such that, during a failure or disruption of the power supply in the gas turbine power generation system, the hydrogen filling of the hydrogen-cooled generator 3 is diverted to the fuel cell 2 (see hydrogen supply line 20 in FIG. 1) thus providing uninterrupted power supply by the emergency supply grid 10 (see FIG. 1).

Large gas turbine power plants are equipped with hydrogen-cooled generators 3: during a failure or disruption in the power supply provided by the hydrogen hydrogen-cooled generator 3 the hydrogen filling this hydrogen-coolede generator 3 has to be discharged by being flushed with inert gas and CO2, later replaced by ambient air. The flushing of the hydrogen-cooled generator 3, from hydrogen, inert gas and CO2 is typically the process requiring a longest time to bring the gas turbine power plant into a safe state. Therefore, with the system of the invention, this time-consuming process is diverted and is used to provide power for the fuel cell 2 by means of the supply line 20, therefore being provided a more efficient system.

The fuel cell 2 comprises an anode (negative side), a cathode (positive side) and an electrolyte that allows charges to move between the two sides of the fuel cell 2, such that electrons are drawn from the anode to the cathode through an external circuit, producing direct current electricity.

Hydrogen is preferably used in the generator 3 rather than air for several reasons:
  inherently better heat transfer characteristic (14 times better than air);
  better heat transfer with higher hydrogen pressure;
  less drag and friction losses than air;
  suppression of partial discharge with increased hydrogen pressure;
  significant increase of the breakdown voltage of generator components.

According to an embodiment of the invention, the fuel cell 2 in the emergency power supply system 1 is fed with the diverted hydrogen filling the hydrogen-cooled generator 3 (supply line 20) in case of failure or disruption of the power supply, and also with hydrogen from the plant hydrogen storage 4 (supply line 40) or with hydrogen from the generator auxiliaries 5 (supply line 50). The emergency power supply system 1 can be configured as an uninterruptible power supply (UPS) system providing emergency power in a gas turbine power generation system (emergency supply grid 10).

The emergency power supply system 1 can also be configured as an independent power generating system feeding a gas turbine power generation system, by means of the independent power supply 60 (FIG. 1).

Furthermore, the emergency power supply system 1 can be configured as an uninterruptible power supply (UPS) system (emergency supply grid 10) and an independent power generating system (independent power supply 60), both configured into one system and used within a gas turbine power generation system (this is the configuration actually shown in FIG. 1, attached).

Although the present invention has been fully described in connection with preferred embodiments, it is evident that modifications may be introduced within the scope thereof, not considering this as limited by these embodiments, but by the contents of the following claims.

The invention claimed is:
1. A gas turbine power generation system, comprising:
  a hydrogen-cooled generator;
  a plant hydrogen storage;
  generator auxiliaries configured to receive hydrogen from the plant hydrogen storage, process the hydrogen, and feed the hydrogen to the hydrogen-cooled generator for cooling of the generator; and
  an emergency power supply system that comprises a fuel cell;
  the fuel cell directly connected to the hydrogen-cooled generator via at least one supply line such that hydrogen is feedable to the fuel cell during purging of hydrogen from the hydrogen-cooled generator that occurs during a failure or disruption in operation of the gas turbine power generation system such that hydrogen purged from the hydrogen-cooled generator is fed to the fuel cell, the fuel cell configured to generate electricity from the hydrogen received from the hydrogen-cooled generator.

2. The gas turbine power generation system according to claim 1, wherein the gas turbine power generation system is configured so that the fuel cell is configured to receive additional hydrogen from the plant hydrogen storage and/or to receive additional hydrogen via the generator auxiliaries during a failure or disruption in operation of the generator.

3. The gas turbine power generation system according to claim 1, wherein the emergency power supply system is configured as an uninterruptible power supply (UPS) system.

4. The gas turbine power generation system according to claim 1, wherein the emergency power supply system is configured as an independent power generating system.

5. The gas turbine power generation system according to claim 1, wherein the emergency power supply system is configured as an uninterruptible power supply (UPS) system and an independent power generating system that are configured into one system.

6. The gas turbine power generation system of claim 1, wherein the generator auxiliaries are configured as a gas unit that is configured to process hydrogen received from the plant hydrogen storage prior to the hydrogen being fed to the hydrogen-cooled generator.

7. The gas turbine power generation system of claim 1, wherein the hydrogen-cooled generator is configured to receive inert gas and carbon dioxide to purge the hydrogen from the hydrogen-cooled generator and feed the purged hydrogen to the fuel cell.

8. The gas turbine generation system of claim 1, wherein the fuel cell is configured to produce direct current electricity.

9. The gas turbine system of claim 1, wherein the fuel cell is configured to receive additional hydrogen from the plant hydrogen storage.

10. The gas turbine system of claim 1, wherein the fuel cell is configured to receive additional hydrogen from the generator auxiliaries.

11. The gas turbine system of claim 1, wherein the fuel cell is configured to receive additional hydrogen from both the generator auxiliaries and the plant hydrogen storage.

12. The gas turbine power generation system of claim 1, wherein the generator auxiliaries are configured as a gas unit that is configured to condition, clean, and cool the hydrogen prior to the hydrogen being fed to the hydrogen-cooled generator.

13. The gas turbine power generation system of claim 1, wherein the generator auxiliaries are configured to condition, clean, and cool the hydrogen prior to the hydrogen being fed to the hydrogen-cooled generator.

14. The gas turbine power generation system of claim 1, wherein the fuel cell is directly connected to the hydrogen-cooled generator such that there is no storage device located between the fuel cell and the hydrogen-cooled generator along the direct connection between the fuel cell and the hydrogen-cooled generator.

15. The gas turbine power generation system of claim 1, wherein the hydrogen-cooled generator is configured to purge hydrogen during the failure or disruption in operation of the gas turbine power generation system such that the hydrogen purged from the hydrogen-cooled generator is fed to the fuel cell via the direct connection between the hydrogen-cooled generator and the fuel cell.

16. A gas turbine power generation system, comprising:
a hydrogen-cooled generator having hydrogen as a coolant,
a plant hydrogen storage,
generator auxiliaries, and
an emergency power supply system comprising a fuel cell configured to use hydrogen as fuel to generate electricity from hydrogen directly supplied to the fuel cell by the hydrogen-cooled generator during a failure or disruption in operation of the gas turbine power generation system such that the hydrogen from the hydrogen-cooled generator is purged from the hydrogen-cooled generator in response to the failure or disruption and is directly fed to the fuel cell.

17. A method for operating a gas turbine power generation system, the gas turbine power generation system comprising:
a hydrogen-cooled generator having hydrogen as coolant,
a plant hydrogen storage,
generator auxiliaries, and
an emergency power supply system comprising a fuel cell configured to use hydrogen as fuel, the method comprising:
directly supplying hydrogen from the hydrogen-cooled generator to the fuel cell in response to a failure or disruption of operation of the gas turbine power generation system, wherein the hydrogen that is directly supplied to the fuel cell is hydrogen that is purged from the hydrogen-cooled generator during the failure or disruption; and
generating electricity by the fuel cell using the hydrogen directly supplied from the hydrogen-cooled generator to the fuel cell.

18. The method of claim 17, wherein the hydrogen is directly supplied to the fuel cell via at least one line.

* * * * *